United States Patent
Oblak et al.

(10) Patent No.: US 8,382,018 B2
(45) Date of Patent: Feb. 26, 2013

(54) FOOD PROCESSOR AND METHOD FOR OPERATING A FOOD PROCESSOR

(75) Inventors: Aleksander Oblak, Recica ob Savinji (SI); Jurij Pesec, Slowenien (SI); Darko Rudez, Slowenien (SI); Roman Sabec, Smartno (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 294 days.

(21) Appl. No.: 12/672,280

(22) PCT Filed: Jul. 30, 2008

(86) PCT No.: PCT/EP2008/059976
§ 371 (c)(1),
(2), (4) Date: Feb. 5, 2010

(87) PCT Pub. No.: WO2009/021842
PCT Pub. Date: Feb. 19, 2009

(65) Prior Publication Data
US 2011/0186662 A1 Aug. 4, 2011

(30) Foreign Application Priority Data
Aug. 14, 2007 (DE) .......................... 10 2007 038 349

(51) Int. Cl.
*B02C 19/00* (2006.01)
(52) U.S. Cl. .......................... 241/36; 241/37.5; 241/282.1
(58) Field of Classification Search .................... 241/36, 241/37.5, 281.2, 282.1
See application file for complete search history.

(56) References Cited

U.S. PATENT DOCUMENTS

| | | | |
|---|---|---|---|
| 4,542,857 A | 9/1985 | Akasaka | |
| 4,614,306 A * | 9/1986 | Doggett | 241/37.5 |
| 5,544,573 A * | 8/1996 | Gateaud | 99/492 |
| 5,875,706 A * | 3/1999 | Borger et al. | 99/492 |
| 5,979,806 A | 11/1999 | Borger et al. | |
| 6,112,649 A | 9/2000 | Jeong | |
| 6,375,102 B1 * | 4/2002 | Bouleau et al. | 241/37.5 |
| 6,481,342 B2 * | 11/2002 | Thackray | 99/340 |
| 6,637,681 B1 | 10/2003 | Planca et al. | |
| 6,640,698 B2 | 11/2003 | Pavlovic et al. | |
| 6,715,706 B1 | 4/2004 | Planca et al. | |
| 6,889,924 B2 * | 5/2005 | Pavlovic et al. | 241/37.5 |
| 7,047,872 B2 * | 5/2006 | Mulle | 99/337 |
| 7,069,839 B2 * | 7/2006 | Kernan | 99/337 |
| 7,708,215 B2 * | 5/2010 | Wang | 241/37.5 |
| 2003/0205635 A1 * | 11/2003 | Lazzer et al. | 241/37.5 |
| 2004/0251342 A1 * | 12/2004 | Wanat | 241/37.5 |
| 2008/0111011 A1 * | 5/2008 | Wang | 241/37.5 |
| 2008/0230639 A1 | 9/2008 | Ferraby | |
| 2010/0206701 A1 * | 8/2010 | Ferraby et al. | 200/50.1 |

FOREIGN PATENT DOCUMENTS
DE 20201898 U1 5/2002
WO 2008031711 A1 3/2008

* cited by examiner

*Primary Examiner* — Faye Francis
(74) *Attorney, Agent, or Firm* — James E. Howard; Andre Pallapies

(57) ABSTRACT

A food processor having a coupling point to attach a processing device to the food processor; a cover part; a detection device disposed at the coupling point, wherein the detection device detects the attached processing device or the cover part; wherein each of the processing device and the cover part has a respective actuating element to actuate the detection device; and wherein the detection device has at least a first actuating region and a second actuating region that is oriented differently from the first actuating region.

13 Claims, 4 Drawing Sheets

FOOD PROCESSOR AND METHOD FOR OPERATING A FOOD PROCESSOR

BACKGROUND OF THE INVENTION

The present invention relates to a food processor having a coupling point disposed on its housing. It further relates to a system comprising a food processor and at least a first and a second processing device, and to a method for operating a food processor, wherein a detection device is actuated by attaching a processing device to a coupling point provided on the food processor for that purpose.

Food processors are known from the prior art on which different processing devices for processing and preparing foodstuffs can be disposed. Processing devices of said type include, for example, blending jugs, kneading hooks, whisks or chopping blades. In order to dispose the processing devices on the food processors and in order to operate the processing devices, the food processors include coupling points at which suitable driving means are provided, typically a shaft that is driven by a motor of the food processor.

To ensure a food processor cannot be placed into operation or, as the case may be, its motor cannot be switched on without a processing device or a cover part of the coupling point covering the coupling points in an operationally safe manner as a protective device, there is provided at each coupling point a detection device by means of which it can be determined whether a processing device or a cover part is attached in the correct manner to each of the coupling points present. In this case the processing devices or cover parts can include actuating elements by means of which the respective detection device of a coupling point to which the processing devices or cover parts are attached, can be actuated.

Food processors having a protection mechanism acting in such a way have already proved themselves in a multiplicity of applications and can significantly reduce the risk of injury when using the food processor. For example, the German patent specification DE 699 02 797 T2 discloses an electrical kitchen appliance for operating a food processing tool of a mixer attachment in which the kitchen appliance can be electrically operated only when an electric safety switch inside the mixer attachment is actuated by correct fitting of the mixer attachment onto a coupling point of the kitchen appliance. For this purpose the mixer attachment includes an actuating pin which can be moved by means of a button, the actuating pin protruding above an end of the mixer attachment facing toward the kitchen appliance and able to extend through a housing opening of the kitchen appliance as far as the electric safety switch when the mixer attachment is fixed ready for operation on the coupling point. When the mixer attachment is in said operating position and the button is pressed, the actuating pin moves vertically downward against the electric safety switch such that the latter can execute a translational movement and in the process close a motor circuit in order to supply current to a motor of the kitchen appliance for the purpose of driving the food processing tool. If no actuating pin acts on the electric safety switch, the motor circuit will not be closed and the electrical kitchen appliance cannot be put into operation.

Also known from the European patent specification EP 1 272 084 B1 is a food processor which is equipped with two coupling points for suitable processing devices, the coupling points being disposed on its housing spaced at a distance from each other. Each of the coupling points has a shaft which can be driven by an electric drive motor. To ensure that the food processor can only be placed into operation when a processing device or a suitable cover part is fitted to each of the coupling points, each of the coupling points is provided with a detection device which can interact with a contact switch located in the electrical circuit of the drive motor. If a processing device or a cover part is not correctly disposed at only one of the coupling points present, at least one of the detection devices remains in a position in which the electrical circuit of the drive motor remains interrupted, with the result that the food processor cannot be placed into operation.

The known protection mechanisms ensure the food processor provides a high level of safety in operation. It can, however, be disadvantageous that the use of the processing devices is restricted to processing devices specifically provided for the food processor, because the detection devices can be actuated only by means of actuating elements that are configured to match the respective detection device. In particular the protection mechanisms of known generic food processors can make it difficult to use or can prevent the use of possibly present older processing devices on the food processor.

BRIEF SUMMARY OF THE INVENTION

The object underlying the present invention is to provide an improved food processor having a detection device. In particular it is the object of the invention to provide an improved food processor on which it is also possible to use processing devices that were not originally provided for the detection device of the food processor.

In order to achieve the object, the present invention teaches a food processor. It also teaches a system consisting of a food processor and at least a first and a second processing device, and a method for operating a food processor.

What is understood by a detection device in the context of the present invention is a device by means of which it can be detected mechanically whether a processing device or a cover part is correctly attached at a coupling point.

In particular the detection device can be actuated by means of suitable actuating elements which can be part of a processing device or cover part.

The processing devices can include, for example, blending jugs, kneading hooks, whisks or chopping blades. However, it is also possible to use other processing devices. A cover part can be attached in place of a processing device to a coupling point of a food processor in order to serve as a protective device when no processing device is to be used on said coupling point but the food processor is to be operated using a processing device on another coupling point of the food processor. Covering the coupling point with the cover part serves to prevent a user of the food processor from being injured by moving parts of the covered coupling point. The cover part can also counteract a soiling of the coupling point.

An actuating element in the context of the invention denotes a part of the processing device or cover part which can mechanically actuate the actuating region of the detection device in a manner in which the latter registers the correct attachment of the processing device or cover part.

The term actuating region describes an area of the detection device by means of which the detection device can enter into effective contact with actuating elements of the processing devices or cover parts when the processing devices or cover parts are correctly fitted onto the coupling point of the food processor. The first actuating region differs from the second actuating region by its location and orientation on the detection device. By means of the two actuating regions of the detection device it is possible for processing devices which act in different ways on the actuating device to be operated on a single coupling point of the food processor. In particular processing devices having differently embodied actuating elements which act on the detection device from different actuating directions, e.g. in the horizontal and in the vertical direction, can be used and operated correctly on one and the same food processor.

By means of the invention it is advantageously possible, with a single food processor, to operate in particular also processing devices which are not provided directly as accessories of the food processor, without having to forego the proven protection functions, i.e. that the food processor can only be placed into operation when a processing device is properly fitted. In this way the range of application of the food processor can advantageously be extended also to processing devices which, for example, are not provided as part of the product package of the food processor. In particular older processing devices can be disposed and correctly operated on the present food processor, without in the process having to do without the previously described protection mechanism.

Advantageous embodiments and developments which can be used individually or in combination with one another are the subject matter of the dependent claims.

Preferably the detection device in the first actuating region can be actuated by application of a force from a first actuating direction, while in the second actuating region it can be actuated by application of a force from a second actuating direction that is different the first. By means of this embodiment of the invention it is possible for the detection device to be actuated from at least two different actuating directions. The actuating directions preferably form an angle between 10° and 180° (relative to a round angle of 360°), particularly preferably between 45° and 135°, particularly preferably between 60° and 120°. Particularly preferably the different actuating directions run essentially at right angles to each other.

Structurally, the detection device can be particularly easily integrated into the food processor if it is moved in a switching direction when being actuated. The term switching direction describes a direction of movement in which the detection device can be displaced by means of an actuating element during the actuation in order to interact with an electrical switching element, e.g. a contact switch, of the food processor. Preferably the detection device is in this case moved linearly in the switching direction.

Advantageously the detection device is guided in such a way that it can be displaced translationally along the switching direction from different actuating directions. A preferred embodiment of the invention provides that at least one of the actuating directions is different from the switching direction of the detection device. To enable the detection device to be moved along the switching direction also in situations when actuating forces not acting in the switching direction act on the detection device, it is advantageous if the detection device is supported in a guide and translationally guided in such a way that actuating forces acting on the detection device from a direction different from the switching direction can also effect a movement of the detection device along a switching direction.

A preferred embodiment of the invention provides that the detection device in the first actuating region can be actuated by application of a force from a first actuating direction running essentially in the switching direction of the detection device. Particularly preferably the switching direction is essentially the same as the direction from which the processing device or the cover part is fitted to the coupling point. During the actuation the actuating device is preferably displaced essentially linearly.

In a preferred embodiment of the invention the detection device in the second actuating region can be actuated by application of a force from an actuating direction that is different from the switching direction. Advantageously the force in the second actuating region can act laterally on the detection device and move the latter linearly also in the switching direction in order to actuate it. Particularly preferably the second actuating region forms a means for redirecting an actuating movement in an actuating direction different from the switching direction, into a movement of the detection device in the switching direction.

The surface normals of the first and second actuating regions preferably form an angle between 10° and 90°, particularly preferably between 22° and 68°, particularly preferably between 30° and 60°, particularly preferably essentially 45°. At least one of the actuating regions, particularly preferably both the first and the second actuating region, is preferably embodied essentially as an even surface. To enable the actuating regions to be easily accessible, they are preferably formed by outer surfaces or top surfaces of the detection device. Particularly preferably the actuating regions are disposed on the detection device such that they face away from each other.

The actuating regions can be disposed spaced at a distance from each other on the detection device. In this way the detection device can interact even with actuating elements which project into the coupling point far apart from each other. An alternative embodiment variant provides that the actuating regions are disposed adjacent to each other on the detection device. This allows the detection device to be built in a particularly more compact design.

The detection device can be implemented in a particularly compact and space-saving manner if the actuating regions are disposed such that they transition smoothly into each other on the detection device. Smoothly means that the surface has a unique tangent at each point. An advantageous embodiment in this respect can provide that the actuating regions form a curved actuating surface on the detection device. Alternatively a non-smooth transition with an edge between the actuating regions is also conceivable.

Preferably at least one of the actuating regions forms an end of the detection device which particularly preferably projects from the housing of the food processor. What is achievable with this embodiment of the invention is that the actuating region is particularly easily accessible by means of the actuating element of the processing device or cover part.

BRIEF DESCRIPTION OF THE DRAWINGS

The invention is explained in more detail below on the basis of an exemplary embodiment and with reference to schematic drawings, in which.

DETAILED DESCRIPTION OF EXEMPLARY EMBODIMENTS OF THE PRESENT INVENTION

Figure 1:
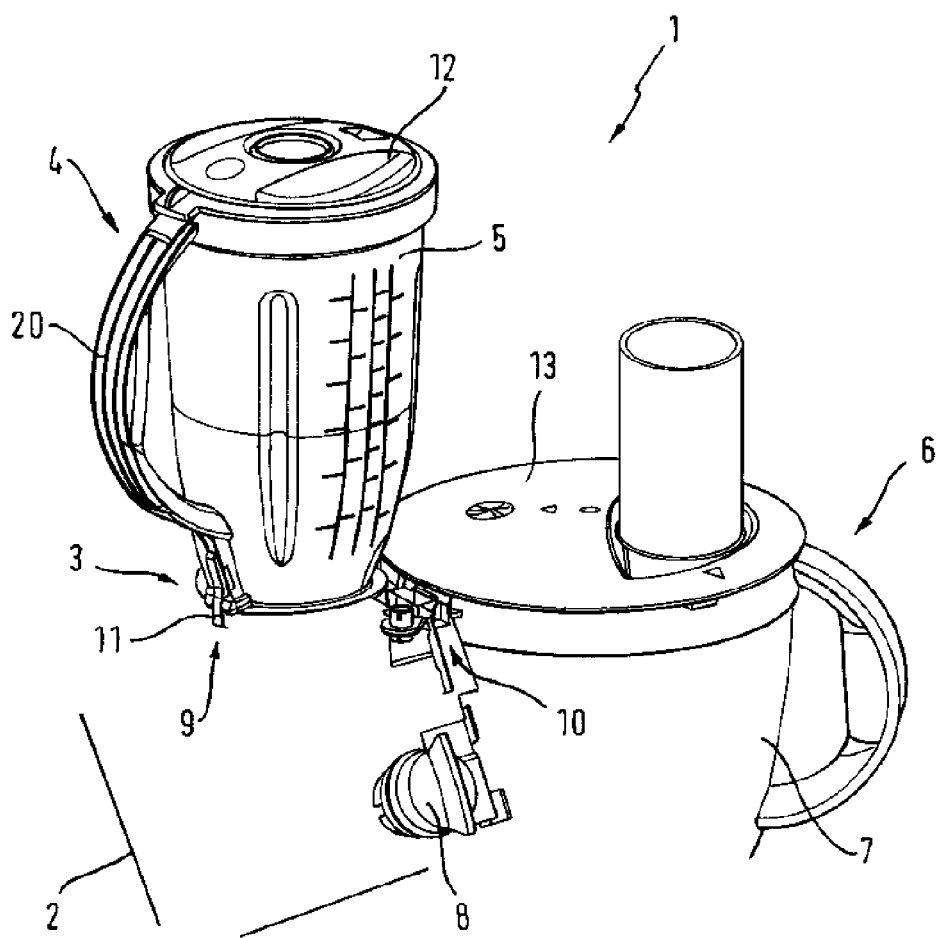
FIG. 1: schematically shows a perspective view of a food processor having two coupling points disposed at a distance from each other on its housing.
Figure 2:
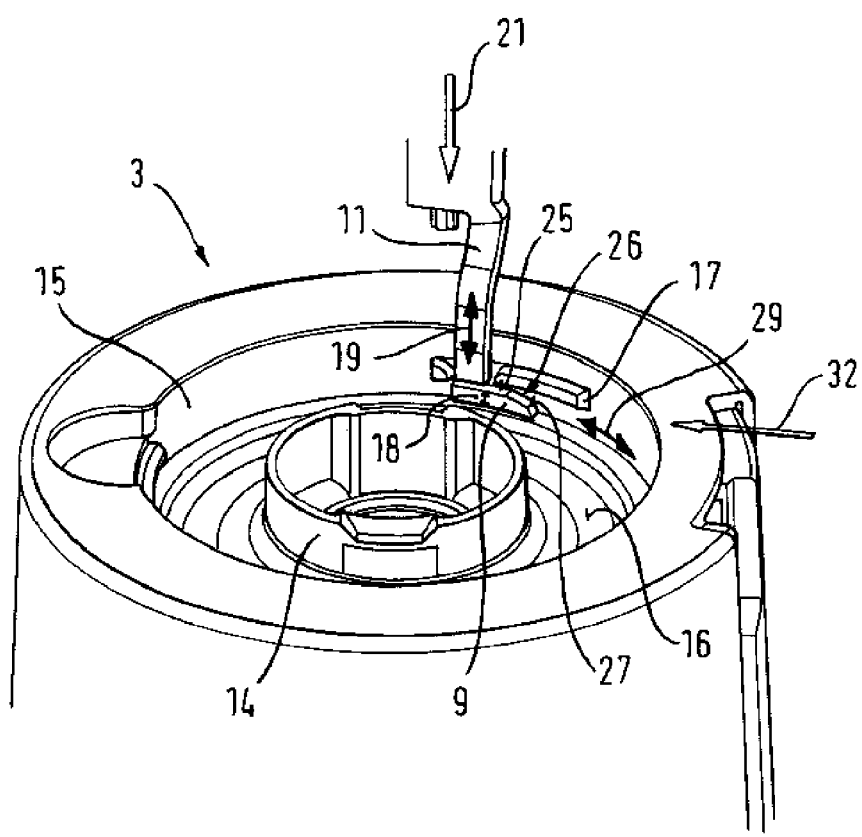
FIG. 2: schematically shows a detail view of a first of the two coupling points of the food processor from FIG. 1.

The food processor 1 shown in FIGS. 1 and 2 comprises a housing 2 (indicated only schematically here) on which there are provided, disposed at a distance from each other, a first coupling point 3 for attaching a first processing device 4 in the form of a blending jug 5 and a second coupling point (not shown) for attaching a second processing device 6 in the form of a mixing bowl 7. An operating switch 8 serves to switch on the food processor 1.

To ensure that the food processor 1 and the processing devices 4 or 6 disposed thereon can be placed into operation only when the processing devices 4 or 6 or cover parts, the cover parts serving as, for example, safety cover 33 for the coupling points 3 or serving in an exemplary embodiment as a lending jug lid 12 or as a mixing bowl lid 13, are disposed on their coupling points 3 or upon a top end of a processing device 4 or 6. A first detection device 9 is provided in the region of the first couple point 3 and a further detection device 10 is provided in the region of the second coupling point.

The first detection device 9 is actuated by means of a first actuating element 11 as soon as both the blending jug 5 is fitted to the coupling point 3 and the blending jug 5 is correctly closed by a blending jug lid 12. Closing the blending jug 5 by means of the blending jug lid 12 serves to prevent a user from being able to reach into the blending jug 5. In this exemplary embodiment the blending jug lid 12 is operatively connected to the actuating element 11 for that purpose. Only when the blending jug lid 12 closes the blending jug 5 in the correct manner can the actuating element 11 act in the desired way on the detection device 9.

Figure 3:
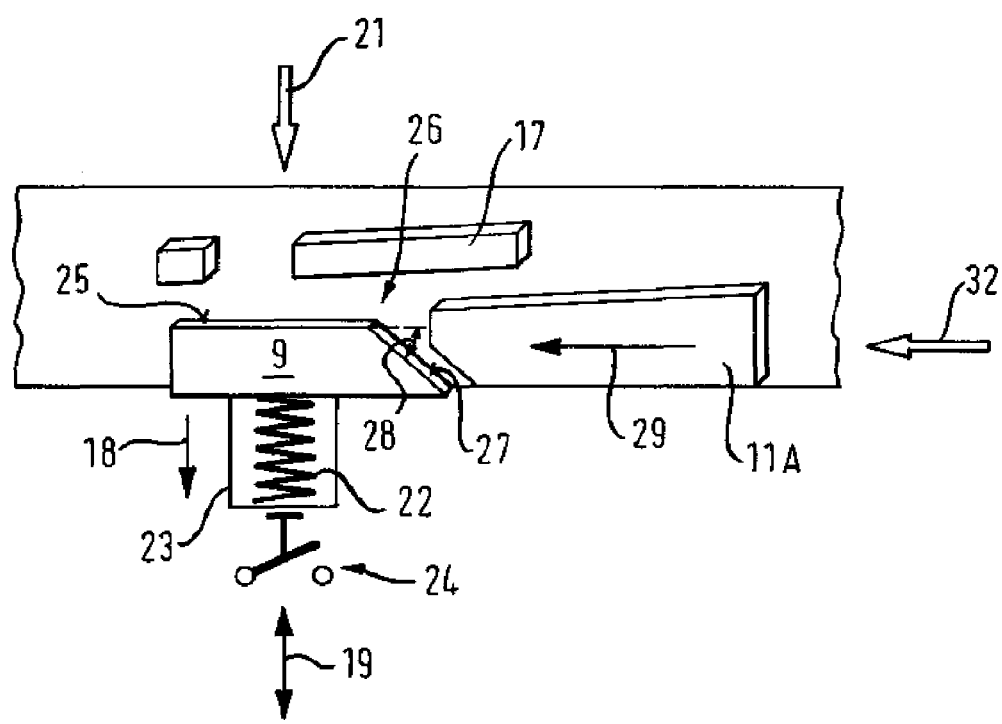
FIG. 3: schematically shows a view of a protection mechanism from a detection device and a contact switch in a motor circuit.

A second actuating element (not shown here in greater detail) acts analogously on the second detection device 10 when a mixing bowl lid 13 is correctly fitted onto the second processing device 6 or the mixing bowl 7, with the result that it is likewise no longer possible to reach into the mixing bowl 7. This second detection device 10 in the region of the second coupling point for the second processing device 6 will not be discussed in further detail in the present description, since the invention is described by way of example and in depth in connection with the first coupling point 3 shown in FIG. 2 and the first detection device 9 provided there (see also FIG. 3).

The first coupling point 3 (see FIG. 2) has a receiving recess 15 embodied concentrically around a drive shaft 14; the first detection device 9 protrudes through the receiving base 16 of said receiving recess and projects into the first coupling point 3. Provided above the first detection device 9 are components 17 of a bayonet fitting by means of which the blending jug 5, for example, can be securely but detachably fixed to the first coupling point 3 of the food processor 1. The first detection device 9 is movable in a switching direction 18 parallel to the drive shaft 14.

The displacement of the actuating element 11 in the actuating direction 19, which runs parallel to the switching direction 18, is effected by means of the blending jug lid 12, with the actuating element 11 being moved toward the first detection device 9 when the blending jug 5 is correctly closed by means of the blending jug lid 12. For that purpose the blending jug lid 12 is connected to the actuating element 11 by suitable means 20 (see FIG. 1).

If the actuating element 11 is now pressed in the actuating direction 19 against the first detection device 9, actuating forces 21 acting in this direction are transmitted to the first detection device 9 and the first detection device 9 displaces itself against a spring force of a spring 22 (see FIG. 3) in the switching direction 18 into the receiving base 16 and consequently also into the housing 2 of the food processor 1. In this arrangement the detection device 9 is supported by a guide 23 in an operationally safe manner and guided linearly along the switching direction 18. The guide 23 is embodied in such a way that the detection device 9 will not tilt or twist in it even when, as will be described in detail below, actuating forces from a different direction than the switching direction act on the detection device 9.

As a result of the actuation of the detection device 9, the contact switch 24 in the housing 2 (see FIG. 3) is moved into a position in which the motor of the food processor 1 can be supplied with current, which means that the food processor 1 can now be switched on or off via the operating switch 8 and the processing devices 4 or 6 can perform their function. The contact switch 24 is an additional means of interrupting the electric circuit of the motor. The contact switch 24 is different from the operating switch 8.

The blending jug 5 has an actuating element 11 which interacts with a first actuating region 25 on the top side on the first detection device 9, as a result of which the first detection device 9 can be translationally displaced directly in the actuating direction 19, which coincides with the switching direction 18. In order to be able also to operate processing devices having differently embodied actuating elements 11A (see FIG. 3) on the first coupling point 3, the detection device has a second actuating region 27 which is inclined by an angle 28 by 45° relative to the first actuating region 25. This means that the detection device 9 has two actuating regions 25 and 27 which adjoin each other.

In the first actuating region 25, the actuating element 11 of the first processing device 4 can actuate the detection device 9 from a first, preferably essentially vertical, actuating direction 19. In addition, the detection device 9 can also be actuated by means of the actuating element 11A which engages with the detection device from an actuating direction 29 in the second actuating region 27 running approximately essentially perpendicular to the switching direction 19. By this means the first detection device 9 can likewise be moved forward and back along the switching direction 18. Advantageously this also enables processing devices which have no actuating elements 11 acting directly on the first detection device 9 in the switching direction to be operated on the first coupling point 3 on the present food processor 1, but instead have an actuating element 11A acting on the first detection device 9 in a direction approximately perpendicular thereto.

Figure 4:
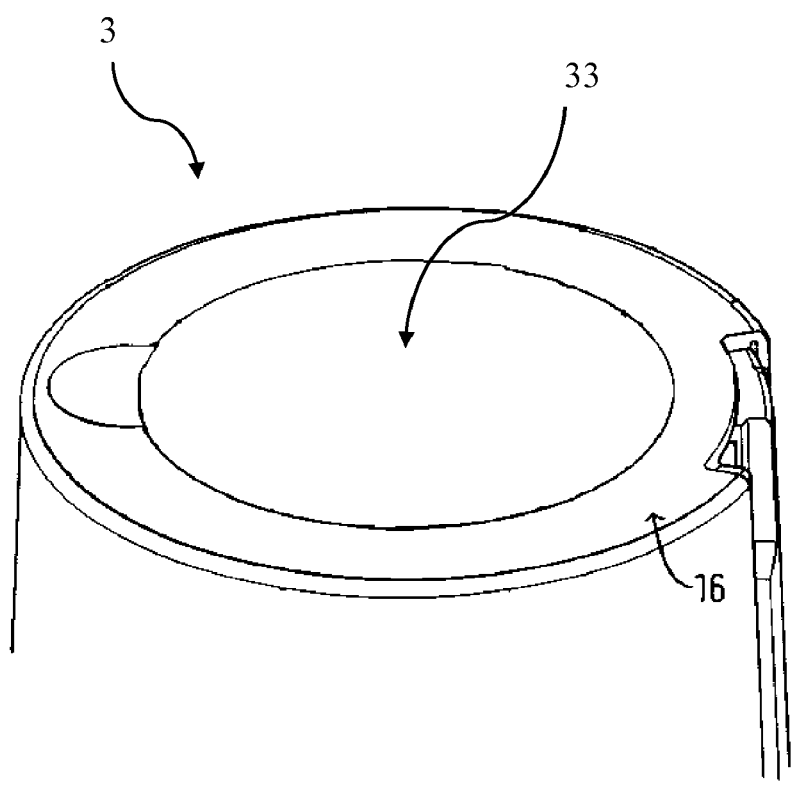
FIG. 4: schematically shows a view of an exemplary cover part at a coupling point on a receiving base of a food processor.

Food processor 1, in an exemplary, non-limiting embodiment, includes cover part 33 (see FIG. 4) that couples with the food processor 1, for example, at first coupling point 3 on receiving base 16. Cover part 33 may include an actuating element, for example actuating element 11 as described in relation to FIG. 2. Cover part 33 may be attached to coupling point 3 in place of a processing device to thereby serve as a protective device by keeping moving parts covered. Cover 33 may also counteract soiling of coupling point 3.

The food processor 1 according to the invention can advantageously be operated with processing devices 4 which engage with the detection device 9 in different ways.

The features disclosed in the foregoing description, the claims and the drawings can be of significance both individually and in any combination for the realization of the invention in its different embodiments.

The invention claimed is:

1. A food processor, comprising:
   a coupling point to attach a processing device to the food processor;
   a lid;
   a detection device disposed at the coupling point, the detection device to detect one of the attached processing device and the lid;
   wherein each of the processing device and the lid has a respective actuating element to actuate the detection device; and wherein the detection device has at least a first actuating region and a second actuating region that is oriented differently from the first actuating region.

2. The food processor of claim 1, wherein the detection device is actuated in the first actuating region by application of a first force from a first actuating direction, and wherein the detection device is actuated in the second actuating region by application of a second force from a second actuating direction that is different from the first actuating direction.

3. The food processor of claim 2, wherein the first actuating direction is substantially identical to a switching direction of the detection device.

4. The food processor of claim 3, wherein the second actuating direction is different from the switching direction of the detection device.

5. The food processor of claim 1, wherein surface normals of the first actuating region and the second actuating region form an angle between 10° and 90°.

6. The food processor of claim 1, wherein at least one of the first actuating region and the second actuating region is embodied as a substantially even surface.

7. The food processor of claim 1, wherein the first actuating region and the second actuating region are disposed at the detection device at a distance from each other.

8. The food processor of claim 1, wherein the first actuating region and the second actuating region are disposed adjacent to each other at the detection device.

9. The food processor of claim 1, wherein the first actuating region and the second actuating region are disposed at the detection device such that the first actuating region and the second actuating region transition smoothly into each other.

10. The food processor of claim 9, wherein the first actuating region and the second actuating region form a curved actuating surface at the detection device.

11. The food processor of claim 1, further comprising a housing; wherein the detection device has an end that protrudes from the housing of the food processor; and wherein the first actuating region and the second actuating region are disposed at the end of the detection device that projects from the housing of the food processor.

12. The food processor of claim 1, wherein the detection device is supported in a guide and translationally guided such that actuating forces acting on the detection device in a direction that is substantially perpendicular to a switching direction of the detecting device effect a movement of the detection device along the switching direction.

13. A system, comprising:
a food processor;
at least one of a first processing device, a second processing device and a lid;
a coupling point to attach at least one of the first processing device and the second processing device to the food processor;
a detection device disposed at the coupling point, the detection device to detect attachment of the at least one of a first processing device, a second processing device and a lid, the detection device having at least a first actuating region and a second actuating region that is different from the first actuating region;
wherein each of the at least one of a first processing device, a second processing device and a lid has a respective actuating element that actuates the detection device by attachment of any one of the at least one of a first processing device, a second processing device and lid to the coupling point;
wherein the first processing device has a first actuating device that actuates the detection device through application of a first force in the first actuating region; and
wherein the second processing device has a second actuating device that actuates the detection device through application of a second force in the second actuating region.

* * * * *